United States Patent
Cypher et al.

(10) Patent No.: US 8,850,120 B2
(45) Date of Patent: Sep. 30, 2014

(54) STORE QUEUE WITH STORE-MERGING AND FORWARD-PROGRESS GUARANTEES

(75) Inventors: Robert E. Cypher, Saratoga, CA (US); Haakan E. Zeffer, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 730 days.

(21) Appl. No.: 12/335,019

(22) Filed: Dec. 15, 2008

(65) Prior Publication Data
US 2010/0153655 A1 Jun. 17, 2010

(51) Int. Cl.
G06F 12/00 (2006.01)
G06F 9/38 (2006.01)
G06F 12/08 (2006.01)

(52) U.S. Cl.
CPC .......... *G06F 9/3834* (2013.01); *G06F 12/0842* (2013.01); *G06F 12/0855* (2013.01); *G06F 9/3851* (2013.01)
USPC .... 711/122; 711/118; 711/130; 711/E12.024; 711/E12.038

(58) Field of Classification Search
USPC ........... 711/139, 122, 130, E12.024, E12.038
See application file for complete search history.

(56) References Cited

U.S. PATENT DOCUMENTS

| | | | |
|---|---|---|---|
| 6,272,602 B1 * | 8/2001 | Singhal et al. | 711/144 |
| 2003/0009643 A1 * | 1/2003 | Arimilli et al. | 711/155 |
| 2004/0068607 A1 * | 4/2004 | Narad | 711/108 |
| 2008/0104326 A1 | 5/2008 | Cypher et al. | |
| 2009/0164758 A1 * | 6/2009 | Haertel | 712/215 |
| 2009/0216951 A1 * | 8/2009 | Shum et al. | 711/124 |

* cited by examiner

*Primary Examiner* — Larry Mackall
(74) *Attorney, Agent, or Firm* — Park, Vaughan, Fleming & Dowler LLP; A. Richard Park

(57) ABSTRACT

Some embodiments of the present invention provide a system that performs stores in a memory system. During operation, the system performs a store for a first thread, which involves creating an entry for the store in a store queue for the first thread. It also involves attempting to store-mark a corresponding cache line for the first thread by sending a store-mark request for the first thread to the memory system, wherein a store-mark on the cache line indicates that one or more store queue entries are waiting to be committed to the cache line. If the attempt to store-mark the cache line fails because a second thread holds a store-mark on the cache line, and if obtaining the store-mark will ensure forward progress for the first thread, the system forces the second thread to release the store-mark, so the first thread can acquire a store-mark for the cache line.

19 Claims, 8 Drawing Sheets

STORE QUEUE WITH STORE-MERGING AND FORWARD-PROGRESS GUARANTEES

BACKGROUND

1. Field

The present invention generally relates to the design of processors within computer systems. More specifically, the present invention relates to a processor with a store queue, which supports store-merging and provides forward-progress guarantees for threads.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load, generates a cache miss, the subsequent access to level-two (L2) cache or memory can require dozens or hundreds of clock cycles to complete, during which time the processor is typically idle, performing no useful work.

In contrast, cache misses during stores typically do not affect processor performance as much because the processor usually places the stores into a "store queue" and continues executing subsequent instructions. Existing store queue designs typically maintain an array of pending stores in program order. Note that some of these pending stores can possibly be directed to the same dataword in the same cache line. In particular, if consecutive stores are directed to the same dataword, these stores can be effectively merged into a single entry in the store queue without violating a conventional memory model, such as the Total-Store-Order (TSO) memory model. This merging can effectively reduce the memory bandwidth because the number of memory accesses is reduced.

However, when "non-consecutive" stores (that is, stores that are separated, in program order, by one or more stores by the same thread to a different dataword) directed to a same dataword are pending in a store queue, these non-consecutive stores to the same dataword typically cannot be merged without violating a conventional memory model, such as TSO. TSO is violated because merging non-consecutive stores effectively reorders the stores with respect to other intervening memory accesses.

This problem can be mitigated by "store-marking" cache lines to indicate that one or more store queue entries are waiting to be committed to the cache lines, and then delaying accesses to the store-marked cache lines by other threads. In this way, stores to a given cache line can be reordered, thereby allowing non-consecutive stores to be merged without violating TSO.

However, when multiple threads are store-marking cache lines, it is hard to ensure that a given thread makes forward progress, because it cannot be guaranteed that the given thread will successfully acquire a store-mark on a needed cache line.

Hence, what is needed is a method and an apparatus for ensuring forward progress for threads in a system which supports store-merging in a store queue.

SUMMARY

Some embodiments of the present invention provide a system that performs stores in a memory system. During operation, the system performs a store for a first thread, which involves creating an entry for the store in a store queue for the first thread. It also involves attempting to store-mark a corresponding cache line for the first thread by sending a store-mark request for the first thread to the memory system, wherein a store-mark on the cache line indicates that one or more store queue entries are waiting to be committed to the cache line. If the attempt to store-mark the cache line fails because a second thread holds a store-mark on the cache line, and if obtaining the store-mark will ensure forward progress for the first thread, the system forces the second thread to release the store-mark, so the first thread can acquire a store-mark for the cache line.

In some embodiments, obtaining the store-mark will ensure forward progress for the first thread if all older stores in the store queue for the first thread have successfully obtained store-marks for their associated cache lines.

In some embodiments, forcing the second thread to release the store-mark involves sending a forward-progress-read-to-own (FPRTO) for the cache line to the memory system, wherein the FPRTO will force the second thread to release the store-mark on the cache line.

In some embodiments, upon receiving the FPRTO at the second thread, the system commits ordered stores for the second thread to the cache line, wherein the ordered stores are stores to the cache line which reside in the store queue for the second thread, and for which all older stores in the store queue for the second thread have successfully obtained store-marks for their associated cache lines. Next, the system releases the store-mark on the cache line.

In some embodiments, performing the store additionally involves creating an entry for the store in a program-order FIFO (POFIFO) for the first thread, wherein the POFIFO is used to keep track of store-marks for the first thread.

In some embodiments, each entry in the POFIFO contains: an address for the store; data for the store; and a byte-mask for the store.

In some embodiments, performing the store additionally involves creating or accessing a cache line record which keeps track of a store-mark request state information for a cache line to which the store is directed. This store-mark-request state information can include the following states: (1) not-sent, which indicates that the given store-mark request has not been sent to the memory system; (2) sent-but-not-acknowledged, which indicates the given store-mark request has been sent, but has not been acknowledged; (3) obtained, which indicates that an associated store-mark has been obtained on an associated cache line; and (4) failed-due-to-conflict, which indicates that the store-mark request failed, and that the failure could have occurred because another thread holds a store-mark on the same cache line.

In some embodiments, performing the store additionally involves creating or updating a non-ordered record for a dataword (or a doubleword) to which the store is directed, wherein the non-ordered record merges together all stores in the store queue for the dataword. In these embodiments, the non-ordered record can be used to perform subsequent RAW bypass operations for the dataword.

In some embodiments, the system maintains an ordered record for the dataword. This ordered record merges together all ordered stores in the store queue for the dataword, wherein an ordered store is a store for which all older stores in the store queue have successfully obtained store-marks for their associated cache lines. Next, upon receiving a cache-coherence request for the cache line, or when stores for the dataword are ready to be written back to the memory system, the system commits the stores in the ordered record to the associated cache line.

DETAILED DESCRIPTION

Figure 1A:
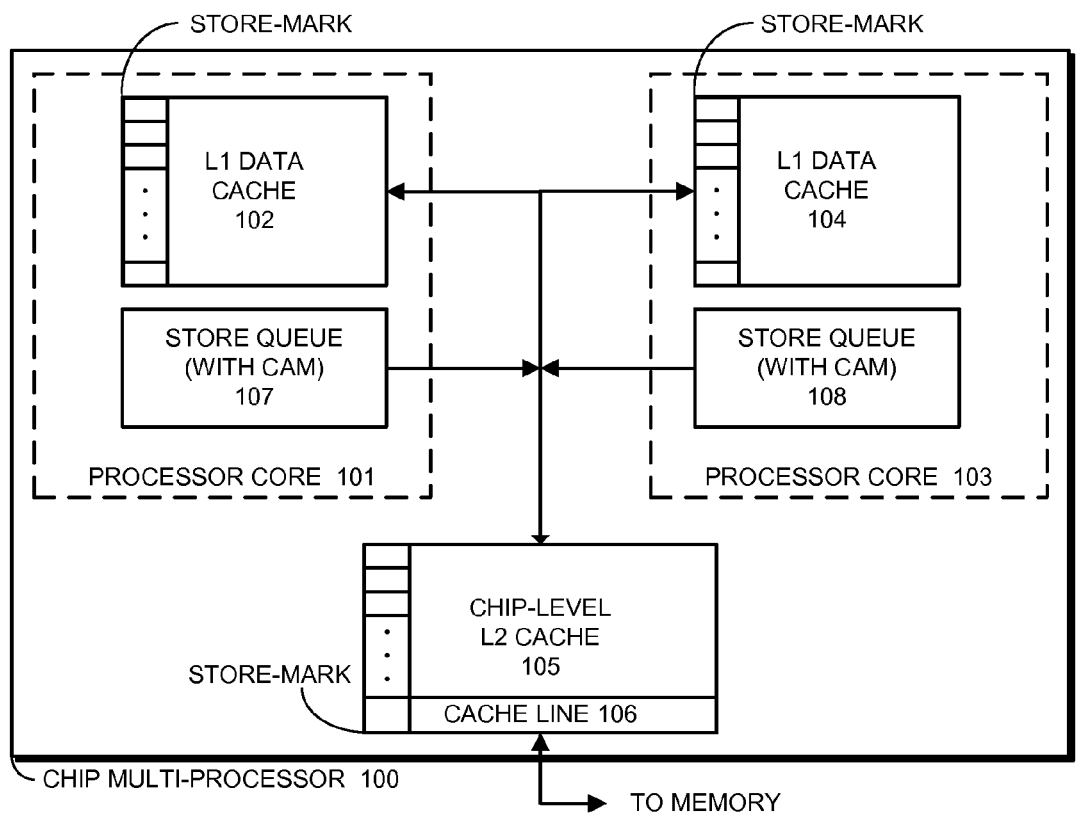
FIG. 1A illustrates an exemplary Chip Multi-Processor (CMP) system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

One embodiment of the present invention provides a memory system which allows stores from a thread to be reordered. To accomplish this without violating a memory model such as TSO, the present invention adds a store-mark to cache lines that are stored to, wherein the store-mark can be propagated to all levels of the memory hierarchy, including all caches and main memory. In addition, each thread maintains a private buffer which keeps track of the addresses of all cache lines for which the thread has set the store-mark. When a particular cache line is store-marked by a thread, that thread obtains exclusive access to the cache line through a cache-coherence mechanism. Because no other thread can access the cache line while the thread's store-mark is set, both consecutive and non-consecutive stores to the same dataword in the cache line can be merged into a single entry in a store queue for the thread. Furthermore, stores directed to a same store-marked cache line can also be merged into a single store to the memory hierarchy to reduce memory bandwidth.

The present invention is described in more detail below, but first we describe how the store queue fits into a computer system.

Terminology

Throughout the description, we use the following terminology in describing embodiments of the present invention. This term is generally known in the art, but is defined below to clarify the subsequent descriptions.

The term "forward progress" refers to the ability of a processor (or an application or thread executing on the processor) to continue performing computational operations. Forward progress can be halted when a processor cannot gain access to a computational resource (i.e., a hardware or software resource) that is needed to continue performing operations. For example, in existing systems that store-mark cache lines, forward progress is halted when a processor (or thread) cannot acquire a store-mark on a cache line because another processor has placed a store-mark (or load-mark) on the cache line.

Computer System

FIG. 1A illustrates an exemplary Chip Multi-Processor (CMP) system 100 in accordance with an embodiment of the present invention. CMP system 100 is incorporated onto a single semiconductor die, and includes two processor cores, 101 and 103.

Figure 1B:
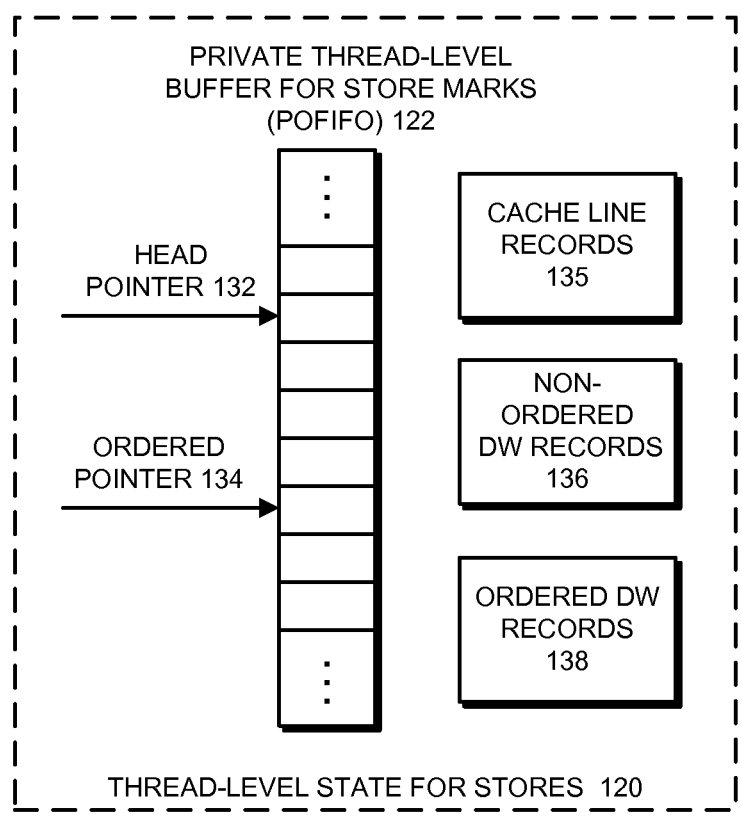
FIG. 1B illustrates thread-level state information which is used for store-marking purposes in accordance with an embodiment of the present invention.

Processor cores 101 and 103 include L1 data caches 102 and 104, respectively, and they share L2 cache 105. Along with L1 data caches 102 and 104, processor cores 101 and 103 include store queues 107 and 108, which buffer pending stores which have not yet passed the trap stage. Once a pending store passes the trap stage, the pending store is maintain in the thread-level state for stores 120 which is illustrated in FIG. 1B.

During a store operation in processor core 101, processor core 101 first performs a lookup for a corresponding cache line in L1 data cache 102. If the lookup generates a miss in L1 data cache 102 (or if store queue 107 is not empty), processor core 101 creates an entry for the store in store queue 107 and sends a corresponding request for the store to L2 cache 105.

During a subsequent load operation, processor core 101 uses a CAM structure to perform a lookup in store queue 107 (and into the thread-level state for stores 120) to locate completed but not-yet-retired stores to the same address that are logically earlier in program order. For each byte being read by the load operation, if such a matching store exists, the load operation obtains its value from store queue 107 (or from thread-level state 120) rather than from the memory subsystem. (This process is referred to as a "RAW-bypassing operation".)

Note that each cache line in L1 data cache 102, L1 data cache 104, and L2 cache 105, as well as in the memory (not shown) can include a store-mark. This store-mark can be used to prevent conflicting memory references from taking place. We discuss how the store-mark is used in more detail below.

Additionally, the system can provide structures for storing thread-level state for stores 120, which includes state information which is used for store-marking purposes (see FIG. 1B). More specifically, these structures 120 can include a private thread-level buffer 122 for each thread, which keeps track of addresses for pending stores for the thread. This thread-level private buffer is referred to as a "Program-Order FIFO (POFIFO)". POFIFO 122 can be implemented as a circular buffer, which includes a head pointer 132 and an ordered pointer 134. Head pointer 132 points to the youngest entry in POFIFO 122. Ordered pointer 134 points to the entry associated with the youngest store for which all older entries in the POFIFO have successfully obtained store-marks for their associated cache lines (such stores are referred to as "ordered stores"). Note that POFIFO 122 does not require any CAM lookup circuitry.

Each entry in POFIFO 122 includes: (1) the address for the store; (2) the store data; and (3) a byte mask indicating which bytes in the dataword (or doubleword) are affected by the store. (Throughout this disclosure the terms dataword and doubleword (DW) are used interchangeably because some implementations can perform a store to a single 32-bit dataword, whereas other implementations can perform a store to a 64-bit doubleword.)

Referring back to FIG. 1B, the thread-level state for stores 120 additionally includes non-ordered DW records 136, ordered DW records 138, and cache line records 135. A non-ordered record for a dataword or a doubleword (in non-ordered DW records 136) merges together all stores in the store queue for the dataword, whether or not store-marks have been obtained for the associated cache lines. This non-ordered record can be used to perform subsequent RAW-bypass operations for the dataword. (A RAW-bypass operation is performed to avoid a read-after-write hazard for store queue entries. Techniques and mechanisms for performing RAW-bypass operations are well known in the art and, hence, are not discussed further in this specification.)

In contrast to a non-ordered record, an ordered record for a dataword (in ordered DW records 138) merges together all "ordered stores" in the store queue for the dataword, wherein an ordered store is a store for which all older stores in the store queue have successfully obtained store-marks for their associated cache lines. Upon receiving a subsequent cache-coherence request for the cache line (such as an FPRTO), or when stores for the dataword are ready to be written back to the memory system, the system commits the stores in the ordered record to the associated cache line. Note that non-ordered DW records 136 and ordered DW records 138 can be stored in separate lookup structures, or alternatively, in a combined lookup structure.

Cache line records 135 enable the system to quickly determine whether a cache line has been store-marked by the thread. For example, the system can perform a lookup in cache line records 135 based on the address of a memory reference to locate an associated entry for a store-marked cache line. Note cache line records 135 can be structured as a CAM to facilitate lookups based on addresses. A given cache line record (in cache line records 135) keeps track of state information for a store-mark request for an associated cache line. More specifically, the state information for a store-mark request indicates the progress of the store-mark request. For example, this state information can indicate whether a given store-mark request is: (1) not-sent, which indicates that the given store-mark request has not been sent to the memory system; (2) sent-but-not-acknowledged, which indicates the given store-mark request has been sent, but has not been acknowledged; (3) obtained, which indicates that an associated store-mark has been obtained on an associated cache line; and (4) failed-due-to-conflict, which indicates that the store-mark request failed, and the failure could have occurred because another thread holds a store-mark on the same cache line.

Additionally, each cache line record (in cache line records 135) can also include a "youngest pointer," which points to a youngest entry in POFIFO 122 containing a store directed to the cache line.

Each cache line record can also include a doubleword mask (or a word mask) which indicates which doublewords (or words) in the cache line are associated with pending stores. This doubleword mask can improve performance during the process of removing a store-mark from a cache line because instead of performing a lookup for every possible ordered record in the cache line to commit the data in the ordered record to the cache line, the system only has to lookup doublewords for the cache line which are associated with pending stores. (The details of how ordered records are committed to the cache line are described in more detail below.)

This doubleword mask can be updated for a store whenever a non-ordered record for the store is inserted into non-ordered DW records 136. It is efficient to set the bit at this time because whenever a non-ordered record is inserted into non-ordered DW records 136 a lookup is performed in cache line records 135 to determine whether a store-mark request has been sent for the cache line. Alternatively, the bit can be set whenever an ordered record associated with the cache line is inserted into ordered DW records 138. However, this will require an additional lookup into cache line records 135.

Performing Memory Operations to a Store-Marked Cache Line

One embodiment of the present invention includes mechanisms for setting a store-mark in each cache line in all levels of the memory hierarchy, including all caches (L1 caches 102 and 104, L2 cache 105 in FIG. 1A) and main memory, wherein the store-mark can occupy a single bit or multiple bits.

Each store-mark can have two values: (1) set, and (2) clear, which are controlled by active threads of the computer system. When a store-mark for a cache line is set, the cache line is effectively locked by the thread which set the store-mark and, hence, is not available to other threads. We will use the term "store-marked" to refer to the "set" state of a store-mark.

When a particular cache line is store-marked by a thread, the thread obtains exclusive access to the cache line. On the other hand, when the store-mark for the cache line is clear, the cache line is typically available to be accessed by memory references from any thread (we will discuss an exceptional case associated with cache-coherence below). The store-mark for a cache line is visible to all threads, so that it can be used by a thread to determine whether the cache line can be accessed.

Because the memory system treats store-marked cache lines as though they are locked, other threads that request a store-marked cache line must wait until the cache line is no longer store-marked before they can access the cache line. In one embodiment of the present invention, a thread attempting to access a store-marked cache line receives a NACK signal indicating that it must retry the load or store. In the case of a load, the load could be treated as if it missed in the cache, thereby causing the load to be deferred.

In one embodiment of the present invention, each thread maintains thread-level state information for stores containing addresses for cache lines which have been store-marked by the thread. Hence, whenever a thread needs to load or store to a cache line, that thread first checks its private buffer to see if it has already set the store-mark for the cache line.

In one embodiment of the present invention, each store queue entry is used to hold uncommitted stores associated with a particular thread. Some of these stores may be directed to a cache line which has been store-marked by the thread. In this case, because no other threads can access the cache line, the stores (whether they be consecutive stores or non-consecutive stores) can be sequentially merged into a corresponding store queue entry. We discuss store-merging in more detail below.

Figure 2:
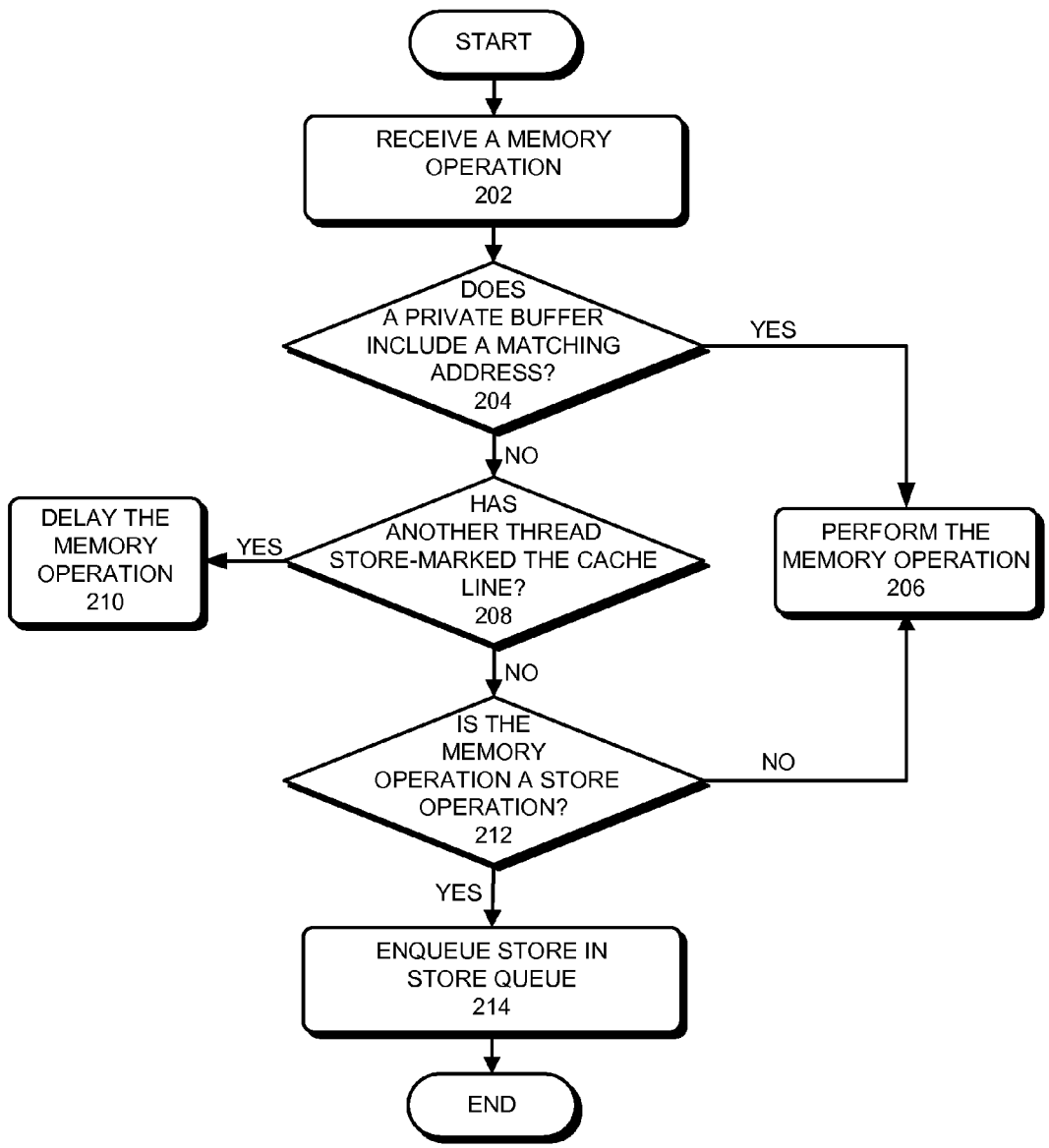
FIG. 2 presents a flow chart illustrating the process of performing a memory operation, such as a load or a store, in accordance with an embodiment of the present invention.

FIG. 2 presents a flow chart illustrating the process of performing a memory operation, such as a load or a store, in accordance with an embodiment of the present invention. The system first receives a memory operation for a thread which is directed to a cache line (step 202). Next, the system checks the thread-level state information for the thread to determine whether a store-mark for the cache line has been set by the thread (step 204). Specifically, the system performs a lookup in cache line records 135 based on the address of the memory reference to locate a matching record for an associated cache line.

If a matching cache line record exists and the state information in this record indicates that the thread has obtained a store-mark for the cache line, the thread can proceed with the memory operation (step 206).

Otherwise, the thread concludes that it has not set the store-mark. The thread subsequently determines (using the process below) whether the cache line has been store-marked by another thread (step 208), and if so, the memory operation is delayed (step 210).

Figure 3A:
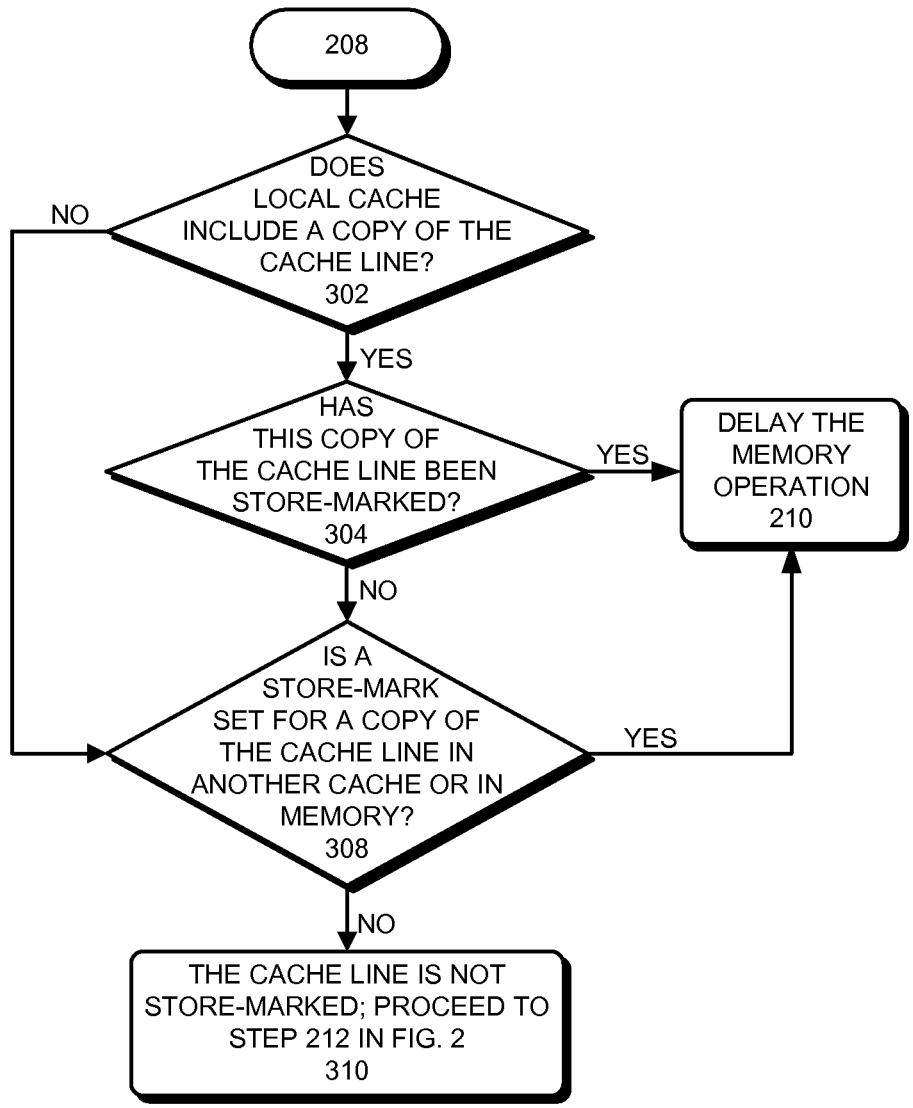
FIG. 3A presents a flow chart illustrating the process of determining whether the cache line has been store-marked by another thread in accordance with an embodiment of the present invention.

FIG. 3A presents a flow chart illustrating the process of determining whether the cache line has been store-marked by another thread in accordance with an embodiment of the present invention. (This flow chart describes in more detail the process which takes place in step 208 in FIG. 2 above.) During this process, the thread first checks in its local cache for a copy of the cache line (step 302). If the thread finds a copy of the cache line, it examines the store-mark to determine whether the cache line has been store-marked by another thread (step 304). If so, the memory operation is delayed (step 210).

If the store-mark in the copy of the cache line is not set, the system determines whether the store-mark has been set in another copy of the cache line which exists in another cache or in memory (step 308). If so, the memory operation is delayed (step 210). Otherwise, the process ends and the system returns to step 212 in FIG. 2 (step 310).

In step 308, note that the system can use a cache-coherence mechanism to determine whether another cache or the memory holds a store-marked copy of the cache line. This can involve sending an access request for the cache line to the other caches. If the cache line has been store-marked in another cache, the system will receive a NACK signal from the other cache which causes the request to fail, in which case the memory operation can be retried. If, however, the system does not receive a NACK signal, it can then obtain access to that cache line.

Referring back to step 206 of FIG. 2, note that in order to perform the memory operation, it may be necessary to use the cache coherence protocol to obtain a copy of the cache line in a suitable state in the local cache. For example, if the memory operation is a load, it may be necessary to obtain a copy of the cache line in the Shared (S), Exclusive (E), Owned (O), or Modified (M) state. Similarly, if the memory operation is a store, it may be necessary to obtain a copy of the cache line in the E or M state (and if it is in the E state, it may be necessary to change it to the M state upon performing the store). Note that if the cache-coherence protocol is used to obtain a copy of the cache line in the E or M state, the request for this copy may differ from the exclusive access request mentioned in the description of step 308 of FIG. 3A. This is because in step 206 the thread performing the store has already placed a mark on the cache line, and thus the request should not receive a NACK signal.

Referring back to step 212 of FIG. 2, when the thread obtains access to the cache line, it determines whether the memory operation is a store operation. If so, the thread obtains writable access to the cache line through a cache-coherence mechanism, which can involve obtaining the cache line in the Exclusive state or the Modified state.

Figure 3B:
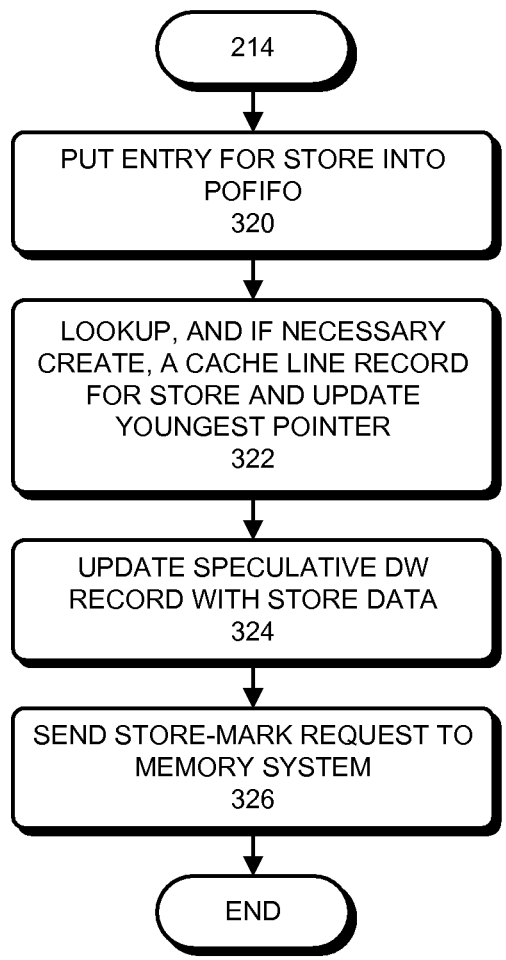
FIG. 3B presents a flow chart illustrating the operations that take place when a store is placed in a store queue in accordance with an embodiment of the present invention.

The system then enqueues the store operation in a store queue and then into the associated thread-level state information 120 (step 214). This involves a number of operations, including store-marking the corresponding cache line. More specifically, referring to FIG. 3B, after a store passes the trap stage in the store queue, the system inserts a corresponding entry for the store into the POFIFO 122 for the thread (step 320). The system also performs a lookup in cache line records 135 and, if necessary, allocates a cache line record for the store. The youngest pointer in this cache line record is set to point to the newly created entry for the store in the POFIFO 122 (step 322).

The system also updates (and if necessary creates) a non-ordered DW record for the associated doubleword with the data from the store (step 324). This involves creating a non-ordered DW record for the doubleword (if one does not exist already) and then ORing the byte mask for the store with the existing byte mask and merging the associated store data. (Recall that this non-ordered DW record can be used for subsequent RAW-bypassing operations.)

Figure 3C:
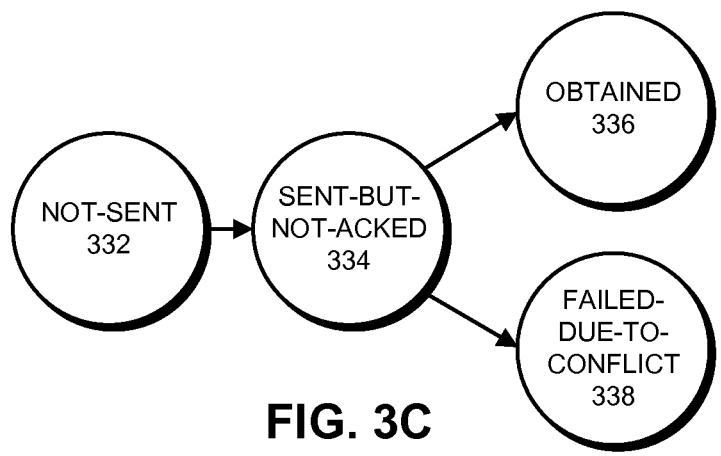
FIG. 3C presents a state diagram for store-mark requests in accordance with an embodiment of the present invention.

If the state information in the cache line record associated with the store indicates that a store-mark request has not yet been sent for the cache line, the system then sends a store-mark request for the cache line to the memory system (step 326). This store-mark request passes through cache-coherence circuitry in the memory system and is ultimately forwarded to the holder of the store-mark (if one exists). (Note that the holder of the store-mark can be identified from metadata in the cache line.) More specifically, FIG. 3C presents a state diagram specifying transitions between states in the life cycle of a store-mark request in accordance with an embodiment of the present invention. First, the store-mark request starts in the "not-sent" state 332, which indicates that the store-mark request has not been sent to the memory system. After the store-mark request has been sent to the memory system (to determine whether another thread holds a store-mark on a cache line associated with the request), the store-mark request transitions to the "sent-but-not-acknowledged" state 334, which indicates the store-mark request has been sent, but has not been acknowledged. Next, an acknowledgment is received for the store-mark request. If this acknowledgment indicates that the store-mark has been successfully obtained, the store-mark request enters the "obtained" state 336. Otherwise, if the acknowledgment indicates that the store-mark request failed, and that the failure occurred because another thread could hold a store-mark on the same cache line, the store-mark request enters the "failed-due-to-conflict" state 338.

As mentioned above, in one embodiment of the present invention, when a thread places a store in the POFIFO 122, it sets a youngest pointer in the cache line record (in cache line records 135) associated with the given cache line to point to the store in POFIFO 122. In such an embodiment, when a thread performs one or more stores to the store-marked cache line (including the youngest store to the cache line as indicated by the youngest pointer in the cache line record for that cache line), the system releases the store-marked cache line by unsetting the store-mark in a copy of the cache line in its local cache, and additionally removing the address of the cache line from its thread-level state information.

In one embodiment of the present invention, once a thread has placed a store-mark on a cache line, all valid copies of that cache line in any of the caches and in memory must contain that store-mark. As a result, if a copy of a cache line with a store-mark is replaced from a cache, and if this replacement makes the copy of the cache line in memory valid, it is necessary to ensure that the copy in memory also contains the store-mark. This could be accomplished by writing back the store-mark to memory when the cache line is replaced from the cache.

While the above description has assumed a store-mark that has only 2 values, namely set and unset, alternate implementations are possible. For example, it is possible to use a store-mark that is either set or unset, and if it is set, it records the identity of the thread that sets it. Note that when such a store-mark is used, in step 204 it is not necessary to check the private buffer to determine if the thread attempting to perform the memory access has placed a store-mark on the cache line. Instead, it is possible to check the store-mark on the cache line to make this determination. Also, note that if the store-mark includes the identity of the thread that placed it, the cache-coherence requests for exclusive access in steps 208 and 308 can be identical, provided they include the identity of the thread performing the request.

Note that it is possible for a thread to place store-marks on cache lines prior to performing certain stores and to not place store-marks on cache lines prior to making other stores. For example, a thread may reorder some stores and not reorder other stores, in which case it may not place store-marks on some or all of the stores that it does not reorder.

Applications of Cache Line Store-Marking

Merging Stores Directed to the Same Dataword

As mentioned previously, consecutive stores directed to the same dataword in a cache line can be merged into a single entry in the store queue without violating the TSO memory model.

In addition, store-marks can be used to enable non-consecutive stores directed to a same dataword to be merged into a single entry in the store queue. This store-merging can be accomplished by merging the bytes that are updated by the younger store into the corresponding dataword in the store queue which has been updated by older stores. It also involves updating corresponding byte mask bits by logically ORing the byte masks of the merged stores. Because the thread has exclusive access to the store-marked cache line, this merging is not visible to other threads, and hence will not cause memory model violations. Furthermore, because the stores are merged into one entry in the store queue, only one store queue entry needs to be applied to the memory.

Merging Stores Directed to the Same Cache Line

In addition to allowing stores directed to the same dataword to be merged in the store queue, store-marking also allows non-consecutive stores directed to the same cache line to be merged before the cache line is propagated to the memory hierarchy. The stores can generally be merged in any order, except that when stores overlap on a byte, the system must ensure that the byte ultimately contains the value of the last store to the byte in the program order.

Note that the merged cache line contains the cumulative result of the multiple stores. This allows a single merged store operation to be propagated to the memory hierarchy instead of multiple separate store operations. This reduces bandwidth to memory.

In one embodiment of the present invention, the act of propagating a store operation to the memory subsystem also clears the store-mark for the cache line.

Reordering Stores to Store-Marked Cache Lines

Another benefit of store-marking cache lines is that it allows a set of stores to be propagated from the store queue into the memory hierarchy in arbitrary order, provided that the set of stores are all store-marked simultaneously. If a set of cache lines are all store-marked simultaneously at a single point in time, they all appear to have been stored to at the single point in time, and in program order, from the perspective of other threads. This ensures that the TSO memory model is not violated.

In addition, store-marks can be used to make a set of stores appear to be atomic in memory order, thereby facilitating implementations of transactional memory.

Processing Returns from Store-Mark Requests

Figure 4:
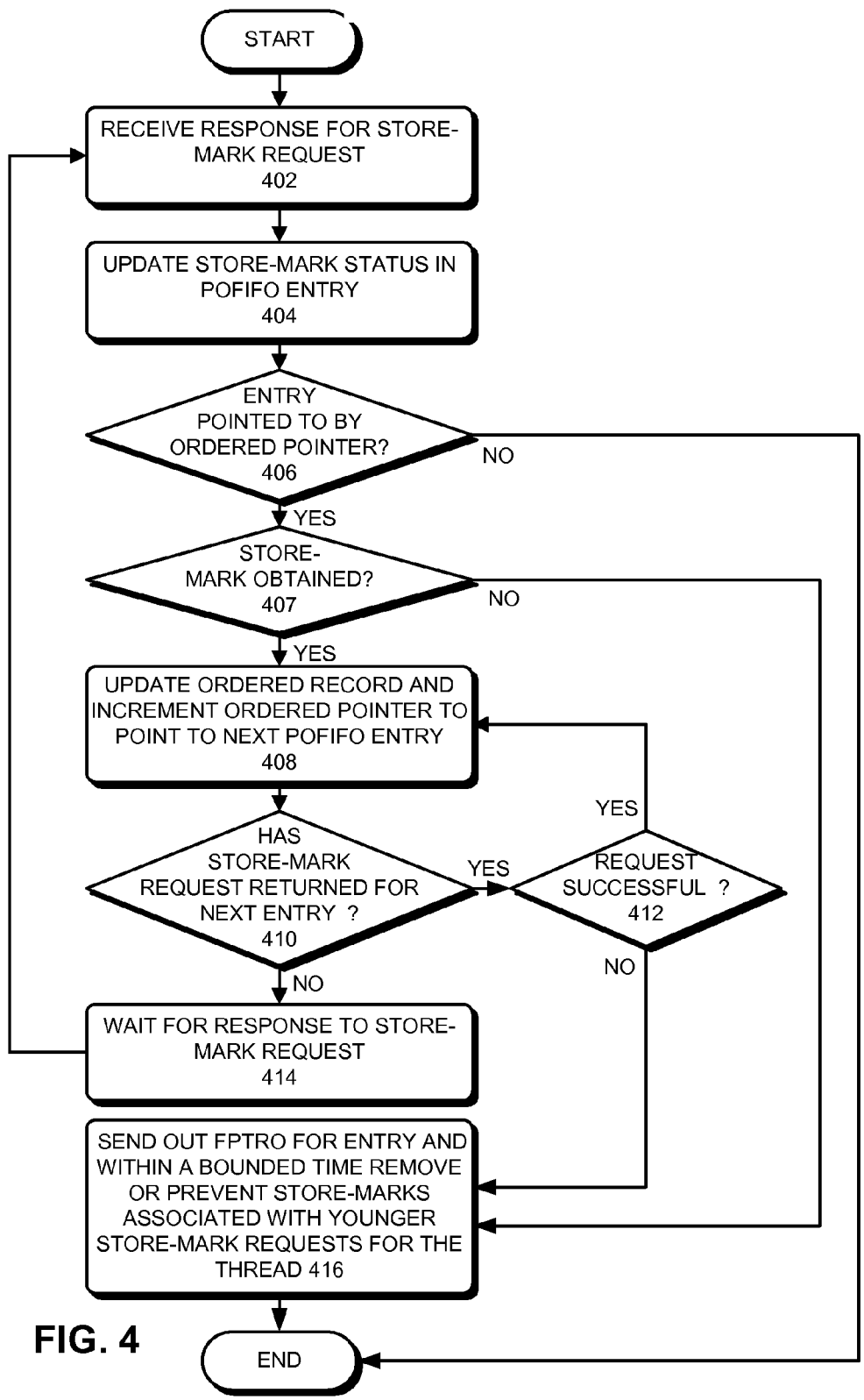
FIG. 4 presents a flow chart illustrating the operations which take place when a store-mark request returns in accordance with an embodiment of the present invention.

FIG. 4 presents a flow chart illustrating the operations which take place when a store-mark request returns in accordance with an embodiment of the present invention. During operation, the system keeps track of store-mark requests for each thread using the POFIFO structure described above. Because the memory system may take a variable amount of time to process these store-mark requests, the store-mark requests can possibly return out of order.

The process starts when a response for a store-mark request is received by a thread (step 402). The system then looks up the corresponding POFIFO entry for the request and updates the state information in the entry for the store-mark request (for example, to indicate whether the store-mark was obtained or the store-mark request failed due to a conflict) (step 404).

Next, the system determines whether the associated record in the POFIFO is pointed to by the ordered pointer (step 406). If not, the processing of the response to the store-mark request is complete. On the other hand, if the associated record in the POFIFO is pointed to by the ordered pointer, the system determines whether the store-mark was obtained for the entry (step 407). If so, the system updates the corresponding ordered record with data from the associated store and increments the ordered pointer to point to the next POFIFO entry (step 408). (At this point, the POFIFO entry is "ordered".) Note that when the system "orders" a store for the doubleword and there exist no younger stores for the same doubleword, the ordered record (which includes the associated ordered stores) can be committed to the memory system and the associated stores can be removed from the thread-level state information for the thread. Also note that when the system orders a store for a doubleword, if there exist no younger stores to the doubleword, the system can use the non-ordered record as the ordered record for the doubleword. To facilitate this process the system can maintain an indicator for the youngest store in each entry in the POFIFO.

Referring back to FIG. 4, if the store-mark was not obtained in step 407, the system sends out an FPRTO for the associated cache line to force the thread that holds the store-mark on the cache line to relinquish the store mark, and within a bounded amount of time the system removes or prevents store-marks associated with younger store-mark requests for the same thread (step 416).

After the ordered pointer is incremented in step 408, the system looks at the next entry which is pointed to by the ordered pointer to determine whether or not the corresponding store-mark request for this next entry has returned (step 410). If not, the system waits for a response to the corresponding store-mark request (step 414), and proceeds to step 402 after this request is received. Otherwise, if the store-mark request for this next entry has returned in step 410, the system determines whether the request was successful in obtaining the store-mark (step 412). If so, the system returns to step 408 to update the ordered record and increment the ordered pointer. Otherwise, if the store-mark request was not successful, the system sends out an FPRTO for the corresponding cache line to force the thread that holds a store-mark on the corresponding cache to line relinquish the store-mark. Next, within a bounded amount of time the system removes or prevents store-marks associated with younger store-mark requests for the same thread (step 416).

As mentioned previously, the system can process store-mark requests in a pipelined manner, which allows a given store-mark request to be initiated before older store-mark requests for the same thread complete. Unfortunately, this can cause a deadlock condition when one or more other threads attempt to store-mark the same cache lines. Such a deadlock can be avoided if the system prevents younger store-mark requests for the same thread from obtaining store-marks, and within a bounded amount of time removes store-marks associated with younger store-mark request for the same thread.

Figure 5:
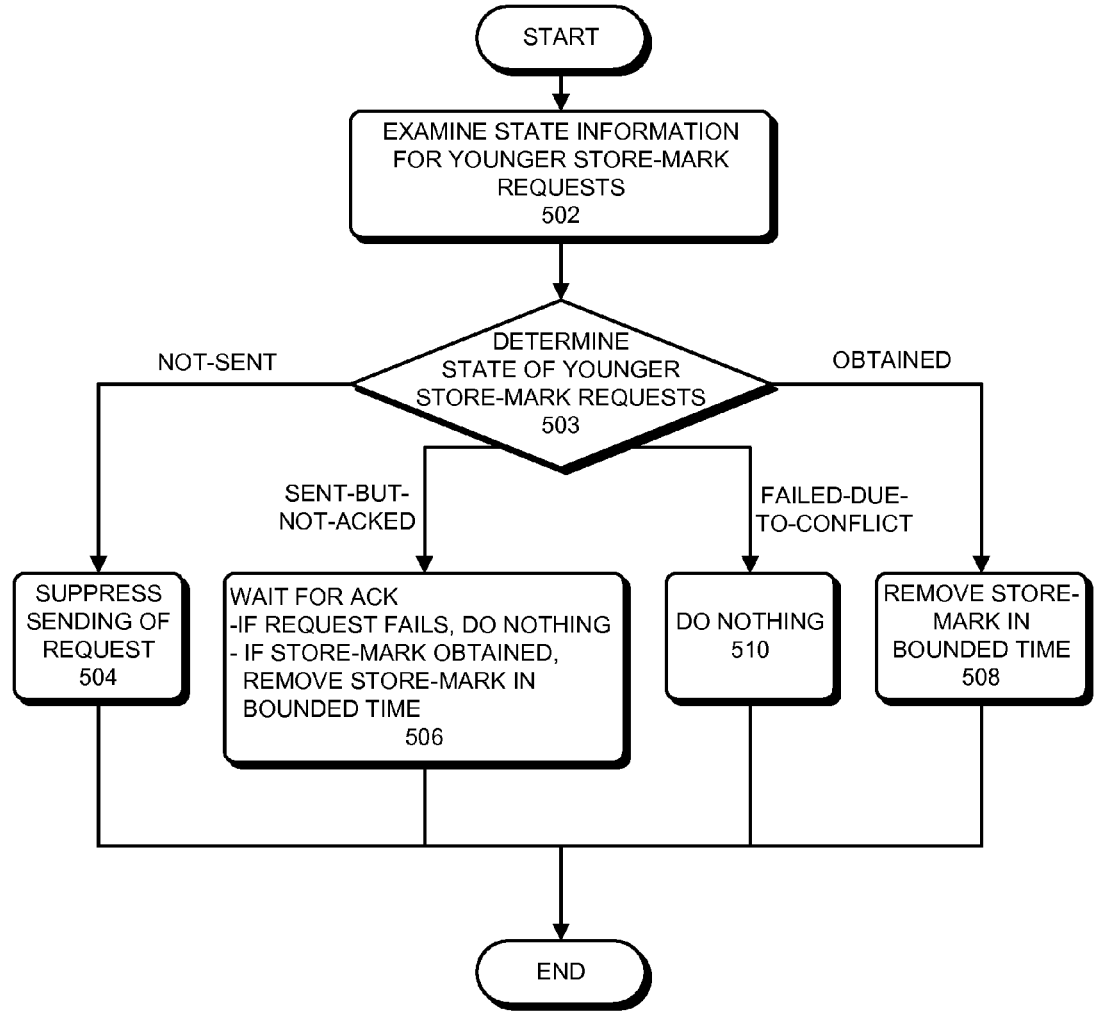
FIG. 5 presents a flow chart illustrating how younger store-mark requests are processed when a store-mark request fails in accordance with an embodiment of the present invention.

More specifically, FIG. 5 presents a flow chart illustrating how younger store-mark requests are processed when a store-mark request fails (as in step 416 in FIG. 4) in accordance with an embodiment of the present invention. First, the system examines state information for the younger store-mark requests (step 502). This enables the system to determine the state of the younger store-mark requests (step 503). If the younger store-mark request is in the "not-sent" state, the system suppresses the sending of the younger store-mark request (step 504). In contrast, if the younger store-mark request is in the "sent-but-not-acknowledged" state, the system waits for an acknowledgment. If the acknowledgment indicates the younger store-mark request failed, the system does nothing about the failure of the younger store-mark request. On the other hand, if the acknowledgment indicates that the associated store-mark has been obtained, the system removes the associated store-mark within a bounded amount of time (step 506). If the younger store-mark request is in the "obtained" state, the system removes the store-mark associated with the younger store-mark request from the cache line (step 508). Finally, if the younger store-mark request is in the "failed-due-to-conflict" state, the system does nothing about the failure of the younger store-mark request (step 510).

FPRTO

An FPRTO is similar to a standard read-to-own (RTO) cache-coherence operation, which is used in a large number of computer systems. In particular, the FPRTO can use the same coherence mechanisms (such as cache-coherence directories) that are used to implement a standard RTO. However, there are differences in the way the FPRTO is processed by a holder of a cache line to which the FPRTO is directed.

Figure 6:
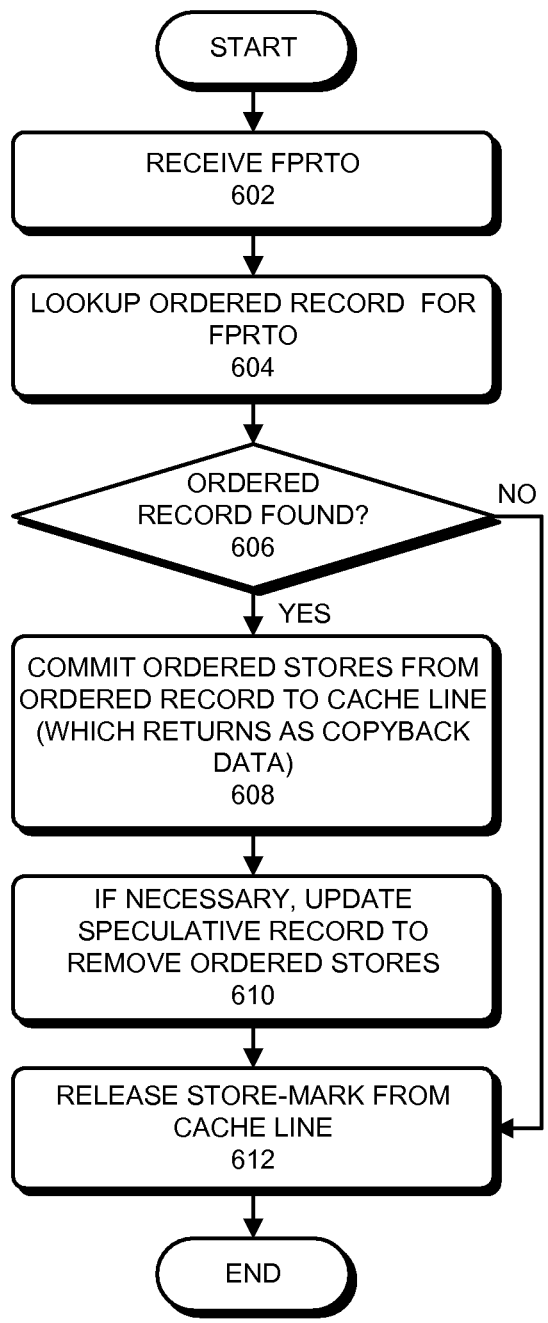
FIG. 6 presents a flow chart illustrating the operations which take place when an FPRTO is received in accordance with an embodiment of the present invention.

More specifically, FIG. 6 presents a flow chart illustrating the operations which take place when an FPRTO is received by a holder of a corresponding cache line in accordance with an embodiment of the present invention. First, a thread receives an FPRTO through the memory system (step 602). Typically, a requesting thread on another processor sends the FPRTO to the memory system, and coherence circuitry in the memory system directs the FPRTO to the thread that holds the store-mark on the associated cache line. (This thread that holds the store-mark can be identified based on a thread identifier which is stored in the metadata for the associated cache line.) After receiving an FPRTO, the thread looks up one or more corresponding ordered records for the cache line in its thread-level state information (step 604). Next, the system determines whether any ordered records exist for the doubleword (step 606). If no ordered records exist, the system simply releases the store mark from the cache line (step 612). On the other hand, if one or more ordered records exist, for each ordered record, the system performs a data-merging operation to commit ordered stores from the ordered record to the cache line (step 608), so that the cache line can be returned to provide "copyback" data. (Note that this data-merging operation may take place at the L2 cache level and may require the recipient of the FPRTO to obtain a writable copy of the cache line from memory or from another processor; this writable copy could be provided as part of handling the FPRTO, or it could be obtained by having the recipient of the FPRTO issue an RTO.)

Next, if necessary, the system recreates the non-ordered record to remove the ordered stores from the non-ordered record (step 610). Note that this may involve shutting down the store queue and traversing all unordered records for the doubleword in the POFIFO to regenerate the non-ordered record without the ordered stores.

Next, the thread releases the store-mark from the cache line (step 612).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for performing a store in a memory system, comprising:
   performing the store for a first thread, wherein performing the store comprises:
      creating an entry for the store in a store queue for the first thread; and
      attempting to store-mark a cache line for the store by sending a store-mark request to the memory system, wherein the store-mark request comprises requesting a store-mark on the cache line for the store, and wherein the store-mark indicates that one or more store queue entries are waiting to be committed to the cache line;
   upon receiving a response to the store-mark request, updating state information in an entry for the store-mark request in a structure for storing thread-level state information for store-marking; and
   when the response to the store-mark request indicates that the store-mark request failed because a second thread holds a store-mark on the cache line, and when an ordered pointer points to the entry for the store-mark request in the structure, sending a forward-progress-read-to-own (FPRTO) request for the cache line to the second thread to force the second thread to release the store-mark so that the first thread can store-mark the cache line.

2. The method of claim 1, wherein obtaining the store-mark will ensure forward progress for the first thread if all older stores in the store queue for the first thread have successfully obtained store-marks for their associated cache lines.

3. The method of claim 1, wherein upon receiving the FPRTO at the second thread, the method further comprises:
   committing ordered stores for the second thread to the cache line, wherein the ordered stores are stores to the cache line which reside in the store queue for the second thread, and for which all older stores in the store queue for the second thread have successfully obtained store-marks for their associated cache lines; and
   releasing the store-mark on the cache line.

4. The method of claim 1, wherein the structure comprises a program-order FIFO (POFIFO) for the first thread, wherein the POFIFO is used to keep track of stores for the first thread.

5. The method of claim 4, wherein each entry in the POFIFO contains:
   an address for the store;
   data for the store; and
   a byte-mask for the store.

6. The method of claim 4,
   wherein performing the store additionally involves creating or updating a non-ordered record for a dataword to which the store is directed, wherein the non-ordered record merges together all stores in the store queue for the dataword; and
   wherein the method further comprises using the non-ordered record, as needed, to perform subsequent read-after-write (RAW) bypass operations for the dataword.

7. The method of claim 6, wherein the method further comprises maintaining an ordered record for the dataword, wherein the ordered record merges together all ordered stores in the store queue for the dataword, wherein an ordered store is a store for which all older stores in the store queue have successfully obtained store-marks for their associated cache lines; and
   wherein upon receiving a cache-coherence request for the cache line, or when stores for the dataword are ready to be written back to the memory system, the method further comprises committing the stores in the ordered record to the associated cache line.

8. The method of claim 7, wherein the FPRTO causes the non-ordered record to be recreated by removing ordered stores from the non-ordered record.

9. The method of claim 1, further comprising:
   receiving a memory operation which is being executed by the first thread, wherein the memory operation can be a load operation or a store operation;
   determining whether the first thread has set a store-mark for a cache line associated with the memory operation;
   if the first thread has set a store-mark for the cache line, performing the memory operation; and
   if the first thread has not set a store-mark for the cache line, determining if the cache line has been store-marked by another thread;
      if the cache line has been store-marked by another thread, delaying the memory operation; and
      if the cache line has not been store-marked by another thread, performing the memory operation or placing a store-mark on the cache line.

10. The method of claim 1, wherein the ordered pointer points to an entry in the structure that is associated with a youngest store for the first thread for which all older entries in the structure have successfully obtained store-marks for their associated cache lines, and
    wherein the structure comprises a private-level buffer for the first thread that keeps track of addresses for pending stores for the first thread.

11. The method of claim 10, further comprising:
    determining whether the response to the store-mark request indicates that the store-mark request failed because the second thread holds the store-mark on the cache line; and
    determining whether the ordered pointer points to the entry for the store-mark request in the structure.

12. The method of claim 1, wherein the FPRTO forces the second thread to release the store-mark on the cache line within a bounded amount of time and causes store-marks associated with younger store-mark requests for the second thread to be removed.

13. A processor that facilitates store-marking while performing a store in a memory system, comprising:
    the processor configured to execute threads;
    a store queue configured to buffer pending stores which are waiting to be committed to a memory system;
    a store-marking mechanism within the processor configured to store-mark cache lines, wherein a store-mark on a cache line indicates that one or more associated store queue entries are waiting to be committed to the cache line;
    a store-mark-tracking mechanism within the processor configured to keep track of store-mark requests that arise during execution of threads, wherein the store-marking mechanism is configured to process store-mark requests in a pipelined manner which allows a store-mark request to be initiated before older store-mark requests for the same thread; and
    wherein the processor is configured to, when a response to a store-mark request for a first thread indicates that the store-mark request failed because a second thread holds a store-mark on the cache line, and when an ordered pointer points to an entry for the store-mark request for the first thread in a structure for storing thread-level state for stores, send a forward-progress-read-to-own (FPRTO) request for the cache line to the second thread to force the second thread to release the store-mark so that the first thread can store-mark the cache line.

14. The processor of claim 13, wherein obtaining the store-mark will ensure forward progress for the first thread if all older stores in the store queue for the first thread have successfully obtained store-marks for their associated cache lines.

15. The processor of claim 13, further comprising a second processor associated with the second thread, wherein upon receiving the FPRTO for the cache line from the memory system, the second processor is configured to:
  commit ordered stores for the second thread to the cache line, wherein the ordered stores are stores to the cache line which reside in the store queue for the second thread, and for which all older stores in the store queue for the second thread have successfully obtained store-marks for their associated cache lines; and
  release the store-mark on the cache line.

16. The processor of claim 13, wherein the structure comprises a program-order FIFO (POFIFO) for the first thread, wherein the POFIFO is configured to keep track of stores for the first thread.

17. The processor of claim 13, wherein while performing the store, the processor is configured to create or update a non-ordered record for a dataword to which the store is directed, wherein the non-ordered record merges together all stores in the store queue for the dataword; and
  wherein the processor uses the non-ordered record, as needed, to perform subsequent read-after-write (RAW) bypass operations for the dataword.

18. The processor of claim 13,
  wherein the processor is configured to maintain an ordered record for the dataword, wherein the ordered record merges together all ordered stores in the store queue for the dataword, wherein an ordered store is a store for which all older stores in the store queue have successfully obtained store-marks for their associated cache lines; and
  wherein upon receiving a cache-coherence request for the cache line, or when stores for the dataword are ready to be written back to memory, the processor is configured to commit the stores in the ordered record to the associated cache line.

19. A computer system that facilitates store-marking while performing a store in a memory system, comprising:
  a processor configured to execute code for threads;
  a memory;
  a store queue configured to buffer pending stores which are waiting to be committed to a memory system;
  a store-marking mechanism within the processor configured to store-mark cache lines, wherein a store-mark on a cache line indicates that one or more associated store queue entries are waiting to be committed to the cache line;
  a store-mark-tracking mechanism within the processor configured to keep track of store-mark requests that arise during execution of threads, wherein the store-marking mechanism is configured to process store-mark requests in a pipelined manner which allows a store-mark request to be initiated before older store-mark requests for the same thread; and
  wherein the processor is configured to, when a response to a store-mark request for a first thread indicates that the store-mark request failed because a second thread holds a store-mark on the cache line, and when an ordered pointer points to an entry for the store-mark request for the first thread in a structure for storing thread-level state for stores, send a forward-progress-read-to-own (FPRTO) request for the cache line to the second thread to force the second thread to release the store-mark so that the first thread can store-mark the cache line.

* * * * *

UNITED STATES PATENT AND TRADEMARK OFFICE
CERTIFICATE OF CORRECTION

PATENT NO. : 8,850,120 B2
APPLICATION NO. : 12/335019
DATED : September 30, 2014
INVENTOR(S) : Cypher et al.

Page 1 of 1

It is certified that error appears in the above-identified patent and that said Letters Patent is hereby corrected as shown below:

On the title page, in the illustrative figure, under Reference Numeral 416, line 1, delete "FPTRO" and insert -- FPRTO --.

In the drawings,

In figure 4, under Reference Numeral 416, line 1, delete "FPTRO" and insert -- FPRTO --, therefor.

Signed and Sealed this
Twenty-eighth Day of April, 2015

Michelle K. Lee
*Director of the United States Patent and Trademark Office*